(No Model.)
E. DENSMORE.
PORTABLE FURNACE.
No. 347,328. Patented Aug. 17, 1886.
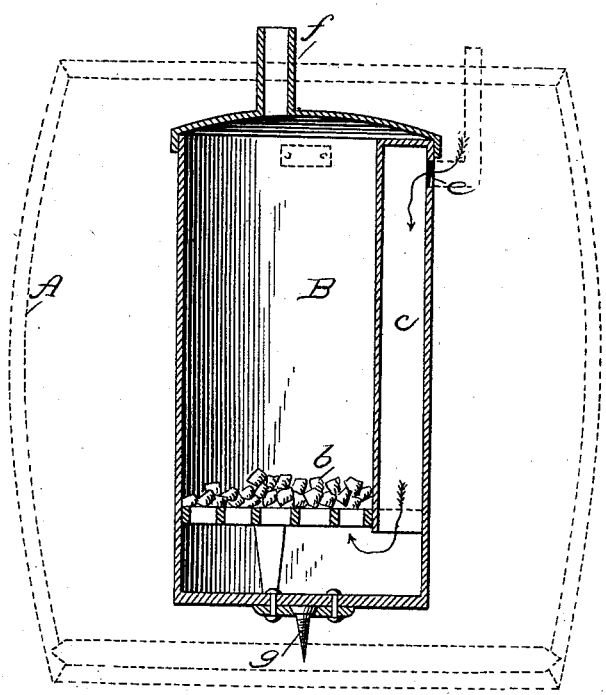

UNITED STATES PATENT OFFICE.

EDWIN DENSMORE, OF GRAND RAPIDS, MICHIGAN.

PORTABLE FURNACE.

SPECIFICATION forming part of Letters Patent No. 347,328, dated August 17, 1886.

Application filed December 13, 1884. Serial No. 150,314. (No model.)

*To all whom it may concern:*

Be it known that I, EDWIN DENSMORE, a citizen of the United States, residing at the city of Grand Rapids, in the county of Kent and State of Michigan, have invented certain new and useful Improvements in Portable Furnaces for Heating Water in Tubs, Barrels, and other Vessels, of which the following is a specification.

My invention relates to a heating apparatus adapted to heat water in barrels, tanks, and the like. Heretofore such heating apparatus, though well known, has not come into extensive use by reason of certain inconveniences hereinafter explained.

The form of heating apparatus shown in Letters Patent of the United States granted to R. Densmore, November 26, 1840, No. 1,866, is substantially the form to which my invention is applied. This heater is adapted to be placed in the barrel or tub containing water which is to be heated, and the heating apparatus, after imparting its heat to the water, is removed from the barrel, leaving the water in the barrel. As the furnace and its pipes are made of sheet metal, and necessarily contain large air-spaces, and as the whole, therefore, is of very small specific gravity, difficulty arises in keeping it down in the water during the operation of heating. Attempt has been made to remedy this difficulty by means such as those shown in the patent of Smith, granted by the United States on the 27th day of January, 1874. In this patent a strap is attached to the bottom of the water-tank on the inside, and a bolt and nut serve, in connection with this strap and the legs of the heating-furnace, to hold the furnace down to the bottom of the water-tank; but this construction requires a special tank, and further requires that the furnace be put in place and fastened down before the tank is filled with water. Neither this nor any similar device is adapted to the purpose required. The furnace should be inexpensive, in order that it may be adapted to agricultural uses. It should be fitted to be used in any ordinary water tank or barrel, which should be capable of being attached to the bottom of said tank or barrel, whether water be in the barrel or not, and it should be capable of removal without removing the water, and at the same time it should be capable of holding the furnace down near the bottom.

To this end my invention consists in providing the bottom of the furnace with a sharp gimlet-pointed screw set at or near the center of the bottom in line with the longer axis of the furnace, and adapted to screw in the bottom of the tank when the furnace is set in place therein. I have shown the form of furnace described in the aforesaid patent of Densmore; but I do not limit myself to this particular form of furnace. Any suitable heating device of the class may be used for my invention.

The invention is illustrated in the accompanying drawing, in which the figure shows a central vertical section taken through the furnace and the barrel in which the furnace is placed.

The barrel A is one of ordinary construction. The furnace B consists of a cylindrical sheet-iron vessel of suitable diameter and length, having a grate, *b*, on which the charcoal or other fuel is placed. A pipe, *c*, on one side leads to the top of the furnace, where it communicates with an opening, *e*, to the atmosphere, and passes down through the grate to discharge air into the ash-pit underneath. A smoke-pipe, *f*, discharges the smoke. To the bottom of the furnace is attached a gimlet-pointed screw, *g*. It is firmly fixed to the bottom at the center, and is adapted by the rotation of the furnace to be turned into the wood of the bottom of the barrel, tank, or receptacle containing the water. This screw when turned thus into the bottom holds the furnace down and in an erect and suitable position, and may be unscrewed readily when the water is heated or it is desirable to remove the furnace for the purpose of replenishing the fuel. The furnace needs no other legs or supports except the screw itself.

Not requiring any special water-receptacle, the only cost to the purchaser is the furnace. It can be used for heating water or cooking food for animals or for scalding hogs, or for any agricultural purposes or for any like uses.

I do not broadly claim any mode of detachably securing the furnace in the bottom of the barrel or tank, nor such construction as that shown in the patent granted to Beach on June 13, 1878, said patent showing a button on the bottom of the furnace and a slotted strap attached to the bottom of the barrel; nor do I claim a pointed screw on the lower end of a standard supporting a tank and burner for melting solder, as shown in the patent to Hayes, granted on the 31st of August, 1875.

I claim as my invention—

The furnace consisting of a sheet-iron vessel having a suitable grate, a pipe leading from the space underneath the grate over the top of the furnace, and communicating with the atmosphere for admitting the air to the ash-pit, and a smoke-pipe, $f$, in combination with a gimlet-pointed screw fixed to the bottom of the furnace, and with its point projecting downwardly, as described.

EDWIN DENSMORE.

Witnesses:
EDWARD TAGGART,
FRED W. STEVENS.